3,511,047
FUEL CONTROL SYSTEMS FOR GAS
TURBINE ENGINES
Thomas Charles Yates, Solihull, England, assignor to Joseph Lucas (Industries) Limited, Birmingham, England
Filed June 6, 1968, Ser. No. 734,936
Int. Cl. F02c 9/08, 3/06
U.S. Cl. 60—39.28                    5 Claims

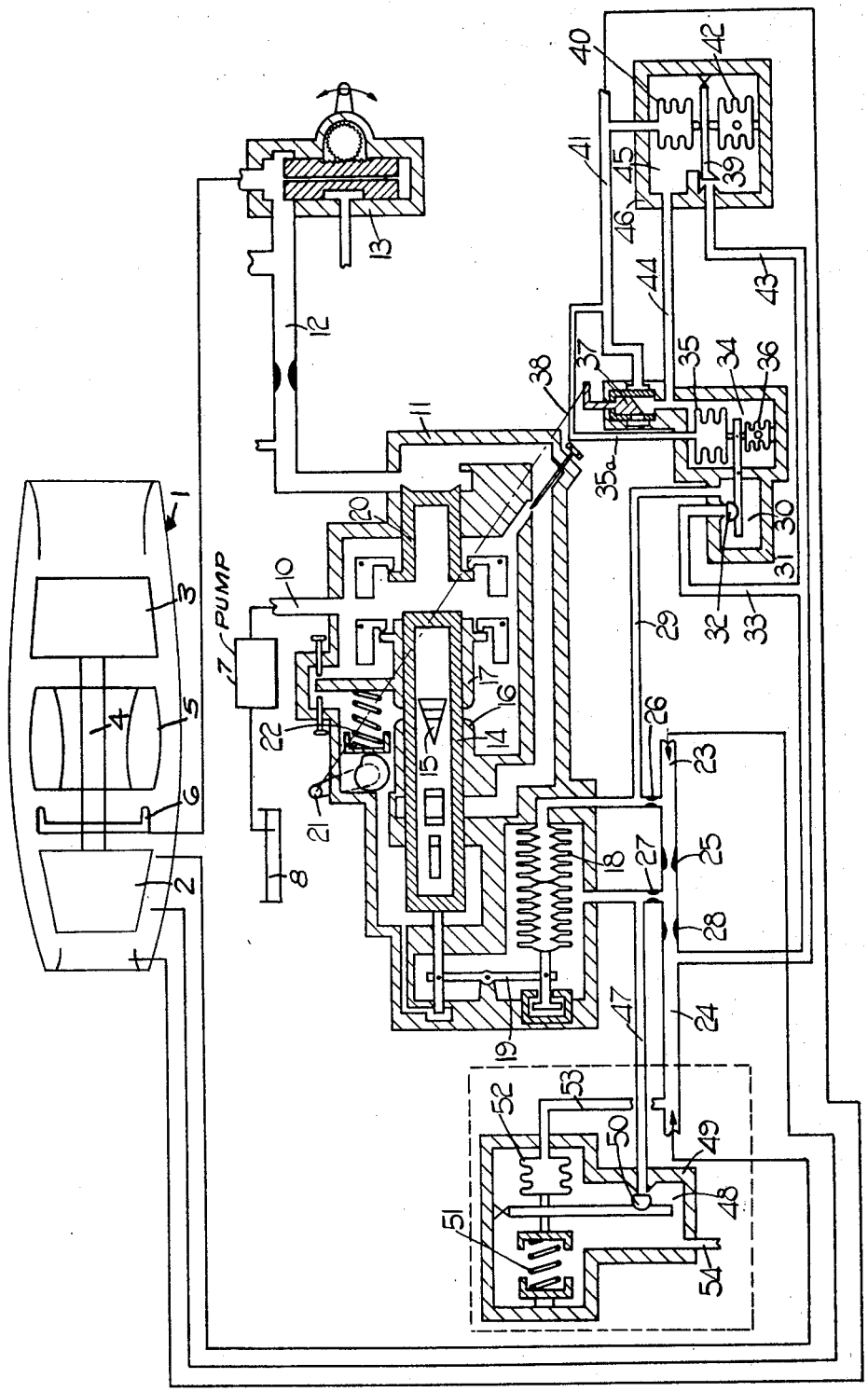

ABSTRACT OF THE DISCLOSURE

A fuel control system for a gas turbine engine having a flexible device which is responsive to two pressures obtained from the engine compressor stage to control the supply of fuel reaching the engine and a device which is responsive to a further pressure obtained from a further stage of the engine compressor, said device also being responsive to the position of a manually set member, and being arranged to actuate a valve, in a passage affording communication between the passages through which higher and lower pressures are supplied to the flexible device to modify the ratio of these pressures which is exerted upon the flexible device.

---

This invention relates to fuel control systems for gas turbine engines and of the kind including a pump for supplying fuel to the engine along a passage, there being in the passage, between the pump and the engine, a control apparatus for controlling the supply of fuel in accordance with a number of parameters related to engine conditions. The parameters include engine speed, and pressure conditions obtaining within the compressor stage of the engine. Two pressures derived from different stages of the compressor, one higher than the other, can be applied to a flexible device, movement of which is transmitted to a mechanism which controls the flow of fuel. Such a system will for convenience be referred to as being of the kind specified.

The object of the invention is to provide a system of the kind specified which is responsive to engine compressor pressures in a specific relationship.

In accordance with the present invention a fuel control system of the kind specified, has means for modifying the response of the flexible device to said two pressures, said means comprising a device which is responsive to a further pressure obtained, in use, from a further stage of the engine compressor, said device also being responsive to the position of a manually set member, the device being arranged to actuate a valve in a passage affording communication between passages through which said higher and lower pressures are applied to the flexible device, to modify the ratio of these pressures which is exerted upon the flexible device.

The invention will now be described by way of example with reference to the accompanying drawing, the single figure of which illustrates diagrammatically one form of apparatus constructed in accordance with the invention.

The drawing shows a gas turbine engine 1 having a compressor 2 and turbine 3 connected by a driving shaft 4. Between the compressor 2 and the turbine 3 is combustion equipment 5 supplied with liquid fuel through burners 6 connected to a manifold which in turn is supplied through a passage 2.

For supplying liquid fuel through the passage 12 there is a fuel control system having a pump 7 which obtains a supply of fuel from a tank 8. There is a passage 10 from the pump 7 leading into a body 11 of control apparatus of substantially conventional kind. The control apparatus includes a fuel metering mechanism whereby the quantity of fuel delivered to the engine through the outlet passage 12 is controlled in accordance with engine speed, with the position of a manual control, and also with pressure conditions obtaining within the engine. The mechanism includes a movable sleeve 14 having at least one opening 15 arranged adjacent to a stationary sleeve 16, and a movable sleeve 17, the latter being positioned in accordance with the speed of drive of the mechanism which corresponds with the speed of rotation of the engine shaft, and the axial position of the inner sleeve 14 being determined in accordance with a pressure ratio applied to a flexible capsule assembly 18 through a lever mechanism 19.

There is also provided a further speed sensitive governor device in the form of a further sleeve 20 movable in the body 11, this sleeve 20 being arranged to control the flow into the outlet passage 12. This sleeve 20 senses the pressure drop created by the opening 15 in the sleeve 14 and maintains the fuel flow in accordance with this in relation to engine speed.

Manual control is applied through an external lever 21 onto a spring 22 which determines the pre-stressing of the governor device, which applies a speed signal to the movable outer sleeve 17 of the fuel metering mechanism. The outlet passage 12 includes a shut-off cock 13.

The apparatus thus far described is substantially conventional, but the invention is concerned with that portion of the apparatus which determines the axial length of the capsule assembly 18, as will be described.

The capsule assembly 18 is divided into two portions, one of these being subjected in its interior to a pressure obtained from a passage 23 whilst the outside of the whole of the capsule assembly 18 is subjected to a pressure obtained from a passage 24, the passages 23 and 24 communicating, at their inlet ends, with different zones of the compressor stage of the engine respectively, the pressure in the passage 24 being, in use, higher than that in the passage 23. The other end of the capsule assembly 18 is evacuated, and is connected to the linkage 19.

In the passages 23 and 24, which also communicate with one another through a restrictor 25, are respective restrictors 26, 27, and there is a further restrictor 28 in the passage 24. The pressure in the passage 24 between the restrictors 27 and 28 is a function of the pressures in the inlet ends of the passages 23 and 24 respectively.

To modify the pressure obtaining within the capsule assembly 18, that is the passage 23, there is provided a control which is sensitive to the ratio of the pressures in the passage 23 and a passage 41 communicating with the engine inlet upstream of the compressor 2 thereof. The control comprises a passage 29 connected to the passage 23, passage 23 at a position adjacent to the restrictor 26 therein, the passage 29 communicating with a chamber 30 formed in a body 31. Pivotally mounted within the body 31 and extending into the chamber 30 is a lever mounted valve closure member 32, the position of which controls communication between the passage 29 and a further passage 33. This passage 33, in turn, communicates with the passage 24. As previously stated, the pressure in the passage 24 is higher than that in the passage 23 when the apparatus is in use.

Thus, the opening of the valve closure member 32 controls the ratio of the two pressures which are applied to the capsule assembly 18. The control also includes apparatus housed within a second chamber 34 within the body 31, and comprising a capsule 35 applying a force in use, to the lever carrying the valve closure member 32, and being balanced by an evacuated capsule 36. The interior of the capsule 35 is subjected to the pressure obtained at the upstream side of the compressor stage of the engine, in the intake to the engine.

This pressure is applied to the interior of the capsule 35 through a passage 35a and the passage 41. Also mounted within the body 31 is a throttling valve 37 connected to the external manual control 21 through a link indicated at 38, this throttling valve 37 determining the rate of escape of air in the chamber 34, around the capsule 35, to the passage 41.

The pressure obtaining within the chamber 34 in the body 31 on the outside of the capsule 35 is determined by a further valve 39, which in turn is positioned by a further capsule 40, to the interior of which the pressure obtaining in the inside of the capsule 35 is also applied. Such pressure reaches the capsule 40 through the passage 41, and this capsule 40 is balanced against an evacuated capsule 42.

The valve 39 controls the pressure of air obtaining within a chamber 45 in a body 46 which houses the valve 39 and the capsules 40 and 42. A passage 44 ensures equality of pressures in the chambers 34 and 45 in the bodies 31 and 46 respectively. The orifices formed by the valve 39 and the throttling valve 37 are in series in regard to the passages 41, 44 and 43, and thus they serve as an air potentiometer of which the intermediate pressure, in 44, is applied to the outside of the capsule 35, thus controlling the valve 32 and thus the pressure in the capsule 18.

It may be desirable further to modify the pressure ratio existing across the capsule assembly 18, and such further modification is intended to limit the maximum pressure developed in the compressor, and it is intended therefore that the pressure in the passage 24 shall be used to control the capsule assembly in such a way that it is possible for fuel delivery to the engine to be reduced in the event that the pressure 24 rises above a predetermined value.

In order to achieve this, there is a passage 47 which communicates with a chamber 48 in a body 49, the passage 47 communicating with a passage 24 at a position adjacent to, but downstream of, the restrictor 27. Flow through the passage 47 is limited by the position of a lever mounted valve closure member 50, the position of this being determined by the stressing of a spring 51 and by the pressure obtaining within a capsule 52. The pressure within this capsule 52 is obtained through a passage 53 from the inlet end of the passage 24. The chamber 48 is exhausted through an outlet 54.

It will be apparent that in use fuel supply to the engine is controlled in accordance with a specific relationship of the three pressures obtaining in the passages 23, 24 and 41 respectively, and also in accordance with the manual control 21.

It is however to be understood that if desired, the manual control 21 upon the moving sleeve 17 in the metering mechanism may be omitted, and manual control of fuel supply can be limited to the positioning of the throttling valve 37.

Having thus described my invention what I claim as new and desire to secure by Letters Patent is:

1. A fuel control system for a gas turbine engine and comprising a fuel supply pump, a fuel flow passage between the pump and the engine, a control apparatus in said fuel flow passage, said control apparatus being responsive to changes in parameters related to engine operating conditions, a flexible device in said control apparatus arranged to control fuel flow therethrough, two passages permitting application of two pressures to the flexible device, said pressures being derived from different stages of a compressor in the engine respectively, means for modifying the response of the flexible device to said two pressures, said means comprising passage means affording communication between one of said passages in which one of said two pressures is applied, and a further passage communicating with a further stage of the compressor in the engine, a manual valve, a valve to which the pressure in said further passage is applied, said manual valve and said valve being in series in said passage means, a pressure sensitive device to which the pressure intermediate said manual valve and said valve is applied, and a further valve controlled by said pressure sensitive device to control the ratio of the two pressures in the two passages to modify the response of the flexible device.

2. A fuel control system as claimed in claim 1 in which the pressure sensitive device is responsive, in use, to the pressure existing in the engine air intake.

3. A fuel control system as claimed in claim 1 in which said pressure sensitive device comprises a capsule to which the pressure in said further passage is exerted, said capsule being connected to a valve closure member of said further valve.

4. A fuel control system as claimed in claim 1 in which one of said two passages in which a higher one of said two pressures is applied communicates with a further device for limiting the maximum value of said higher pressure which can be obtained in the compressor of the engine, said further device controlling the pressure at said flexible member which is obtained from the higher of said two pressures through a restrictor.

5. A fuel control system as claimed in claim 1 in which the control apparatus has a manual control and the manual valve is connected to said manual control for operation together with it.

References Cited

UNITED STATES PATENTS

| | | | |
|---|---|---|---|
| 2,846,846 | 8/1958 | Mock | 60—39.28 |
| 2,943,447 | 7/1960 | Davies | 60—39.28 |
| 2,947,141 | 8/1960 | Russ | 60—39.28 |
| 2,966,140 | 12/1960 | Dungan et al. | |
| 3,000,436 | 9/1961 | Lawrence | 60—39.28 X |
| 3,046,739 | 7/1962 | Dahl | 60—39.28 |
| 3,085,397 | 4/1963 | Jubb et al. | 60—39.28 |
| 3,146,591 | 9/1964 | Turner | 60—39.28 |
| 3,164,161 | 1/1965 | Tyler | 60—39.28 X |
| 3,310,939 | 3/1967 | Curran et al. | 60—39.28 |
| 3,371,481 | 3/1968 | Warne | 60—39.28 |

AL LAWRENCE SMITH, Primary Examiner